United States Patent
Weinenger (10) Patent No.: US 9,951,714 B2
(45) Date of Patent: Apr. 24, 2018

(54) STEEL PISTON WITH FILLED GALLERY

(71) Applicant: FEDERAL-MOGUL CORPORATION, Southfield, MI (US)

(72) Inventor: Michael Weinenger, Southfield, MI (US)

(73) Assignee: Federal-Mogul LLC, Southfield, MI (US)

( * ) Notice: Subject to any disclaimer, the term of this patent is extended or adjusted under 35 U.S.C. 154(b) by 61 days.

(21) Appl. No.: 14/700,654

(22) Filed: Apr. 30, 2015

(65) Prior Publication Data

US 2015/0315995 A1   Nov. 5, 2015

Related U.S. Application Data

(60) Provisional application No. 61/986,310, filed on Apr. 30, 2014.

(51) Int. Cl.
 *F02F 3/18* (2006.01)
 *F02F 3/00* (2006.01)
 *B23P 15/10* (2006.01)

(52) U.S. Cl.
 CPC ........... *F02F 3/18* (2013.01); *B23P 15/10* (2013.01); *F02F 3/0092* (2013.01); *F05C 2201/021* (2013.01); *F05C 2201/0448* (2013.01); *Y10T 29/4925* (2015.01); *Y10T 29/49254* (2015.01)

(58) Field of Classification Search
 CPC .. F02F 3/003; F02F 3/00; F02F 3/0084; F02F 3/16
 USPC ........................................... 123/193.6, 41.35
 See application file for complete search history.

(56) References Cited

U.S. PATENT DOCUMENTS

| | | | |
|---|---|---|---|
| 1,089,823 A | 3/1914 | Windeler | |
| 1,270,663 A | 6/1918 | Riedler | |
| 1,515,543 A | 11/1924 | Bowmar | |
| 1,568,835 A | 1/1926 | Hawley, Jr. | |
| 1,605,838 A | 11/1926 | Hawley, Jr. | |
| 2,028,434 A | 1/1936 | Bernard | |
| 2,126,306 A | 8/1938 | Bernard | |
| 2,126,627 A | 8/1938 | Fiedler | |
| 2,155,383 A * | 4/1939 | Carr | F02F 3/18 123/41.16 |
| 2,413,751 A | 1/1947 | Dennis | |
| 2,711,159 A | 6/1955 | Nallinger | |
| 4,356,800 A | 11/1982 | Moebus | |

(Continued)

FOREIGN PATENT DOCUMENTS

| FR | 1494256 A | 9/1967 |
|---|---|---|
| GB | 493664 A | 10/1938 |

OTHER PUBLICATIONS

International Search Report, dated Jul. 10, 2015 (PCT/US2015/028498).

*Primary Examiner* — Long T Tran
(74) *Attorney, Agent, or Firm* — Robert L. Stearns; Dickinson Wright, PLLC (57) ABSTRACT

A steel piston for an internal combustion including a cooling gallery containing a solid coolant, such as an aluminum-based material, is provided. The solid coolant has a thermal conductivity which is greater than the thermal conductivity of the steel material and fills at least 15 volume percent (vol. %) of the cooling gallery. The solid coolant provides for exceptional cooling along a crown of the piston, reduces corrosion and erosion along the crown, and avoids the problem of oil coking.

24 Claims, 4 Drawing Sheets

(56) References Cited

U.S. PATENT DOCUMENTS

| | | |
|---|---|---|
| 4,531,502 A | 7/1985 | Mizuhara |
| 4,552,057 A | 11/1985 | Mizuhara |
| 4,604,945 A | 8/1986 | Mizuhara |
| 4,651,629 A | 3/1987 | Castarede |
| 4,669,367 A * | 6/1987 | Tanaka ............... F02F 3/042 92/227 |
| 4,730,548 A * | 3/1988 | Maeda ............... C22C 47/06 123/193.6 |
| 4,892,069 A | 1/1990 | Roesch et al. |
| 6,354,361 B1 * | 3/2002 | Sachs ............... B22C 9/065 164/128 |
| 7,685,710 B2 * | 3/2010 | Scharp ............... B21K 1/185 29/888.04 |
| 8,714,129 B2 * | 5/2014 | Bauer ............... F02F 3/0023 123/193.6 |
| 2006/0269774 A1 * | 11/2006 | Demers ............... B21D 39/03 428/609 |
| 2010/0319648 A1 * | 12/2010 | Bauer ............... F02F 3/0023 123/193.6 |
| 2013/0104838 A1 * | 5/2013 | Spangenberg ............ F02F 3/16 123/193.6 |
| 2013/0146017 A1 * | 6/2013 | Muscas ............... B23P 15/10 123/193.6 |
| 2013/0160733 A1 * | 6/2013 | Bauer ............... F02F 3/0023 123/193.6 |
| 2014/0083390 A1 * | 3/2014 | Azevedo ............... F16J 1/005 123/193.6 |
| 2014/0102294 A1 * | 4/2014 | Klein ............... F02F 3/22 92/208 |
| 2014/0123930 A1 * | 5/2014 | Lineton ............... F02F 3/16 123/193.6 |
| 2015/0075455 A1 * | 3/2015 | Bischofberger ........... F02F 3/18 123/41.35 |

* cited by examiner

STEEL PISTON WITH FILLED GALLERY

CROSS REFERENCE TO RELATED APPLICATION

This U.S. utility patent application claims the benefit of U.S. provisional patent application Ser. No. 61/986,310 filed Apr. 30, 2014, the entire content of which is incorporated herein by reference.

BACKGROUND OF THE INVENTION

1. Field of the Invention

This invention relates generally to pistons for internal combustion engines, and methods for manufacturing the pistons.

2. Related Art

Pistons used in internal combustion engines, such as heavy duty diesel pistons, are exposed to extremely high temperatures during operation, especially along the upper crown of the piston. Therefore, to moderate temperatures, the pistons are typically designed with a cooling gallery beneath the upper crown, and cooling oil is sprayed into the cooling gallery as the piston reciprocates along a cylinder bore of the engine. The oil flows along the inner surface of the upper crown and dissipates heat away from the upper crown. However, to control the piston temperature during operation, a high flow of oil must be maintained constantly. In addition, the oil degrades over time due to the high temperatures of the internal combustion engine, and the oil must be changed periodically to maintain engine life. Furthermore, when the cooling gallery temperature exceeds 350° C., the oil tends to burn, referred to as oil coking, and adhere to the surface of the gallery.

SUMMARY OF THE INVENTION

One aspect of the invention comprises a piston for an internal combustion. The piston includes a body formed of a steel material, wherein the body includes a crown and a cooling gallery extending along at least a portion of the crown. A solid coolant having a thermal conductivity which is greater than the thermal conductivity of the steel material fills at least 15 volume percent (vol. %) of the cooling gallery. The solid coolant provides for exceptional cooling along the crown, and thus reduced corrosion and erosion along the crown. In addition, conventional gallery oil cooling is typically not required when the solid coolant is used, and thus the problem of oil coking can be avoided. However, even if oil cooling is used, the solid coolant can act as a temperature buffer to spread heat and reduce the temperature of the region where the oil is introduced, so that this region stays below the coking temperature.

Another aspect of the invention comprises a method for manufacturing the piston. The method includes providing the body formed of a steel material, and filling at least 15 volume percent (vol. %) of the cooling gallery with the solid coolant.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE EXAMPLE EMBODIMENTS

Referring to the Figures, wherein like numerals indicate corresponding parts throughout the several views, a piston 20 providing exceptional performance when used in an internal combustion engine according to examples embodiments of the invention is generally shown in FIGS. 1-5. The piston 20 comprises a body 22 formed of a steel material. The body 22 includes a crown 24 and a cooling gallery 26 extending along at least a portion of the crown 24. A coolant 28 fills at least 15 volume percent (vol. %) of the cooling gallery 26. The coolant 28 has a thermal conductivity which is greater than the thermal conductivity of the steel material of the body 22. The coolant 28 is also a solid, typically a metal material, such as an aluminum-based material. Filling at least 15 vol. % of the cooling gallery 26 with the solid coolant 28 provides for exceptional cooling along the crown 24, and reduced corrosion and erosion along the crown 24. Typically, conventional gallery oil cooling is no longer required when the solid coolant 28 is used, and thus the problem of oil coking is avoided.

As shown in the Figures, the body 22 of the piston 20 extends circumferentially around a center axis A and longitudinally along the center axis A from an upper end 30 to a lower end 32. The body 22 includes an outer surface 34 which is exposed to a combustion chamber during use in the internal combustion engine, and an inner surface 36 which faces opposite the other surface 34. The crown 24 includes an upper wall 38, a lower wall 40, and at least one side wall which together define the cooling gallery 26. In the example embodiments of FIGS. 1, 2, and 4, the piston 20 includes an outer side wall 42 and an inner side wall 44 which define the cooling gallery 26. In these embodiments, the cooling gallery 26 extends circumferentially around the center axis A along only a portion of the upper wall 38 of the crown 24 and is spaced radially from the center axis A. In the example embodiment of FIG. 3, however, the piston 220 only includes the outer side wall 242, and thus the cooling gallery 226 extends through the center axis A and continuously along the entire upper wall 238 of the crown 224. FIG. 5 shows another example embodiment wherein the crown 424 includes the upper wall 438, the outer side wall 442, and the inner side wall 444 together defining the cooling gallery 428. In this embodiment, the bottom of the cooling gallery 428 is left open, and thus can be exposed to cooling oil.

Figure 1:
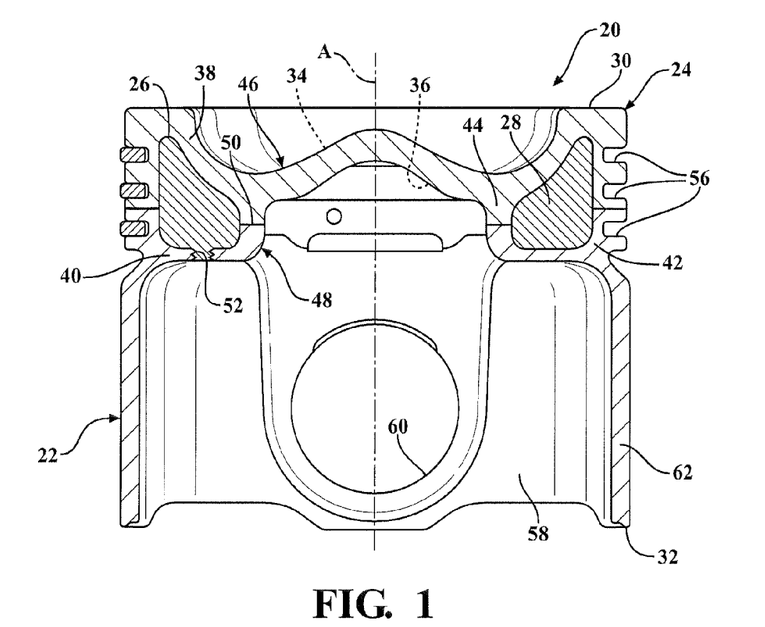
FIG. 1 is a side cross-sectional view of a piston according to one example embodiment wherein 100 volume percent (vol. %) of a cooling gallery of the piston is filled with a solid coolant.
Figure 2:
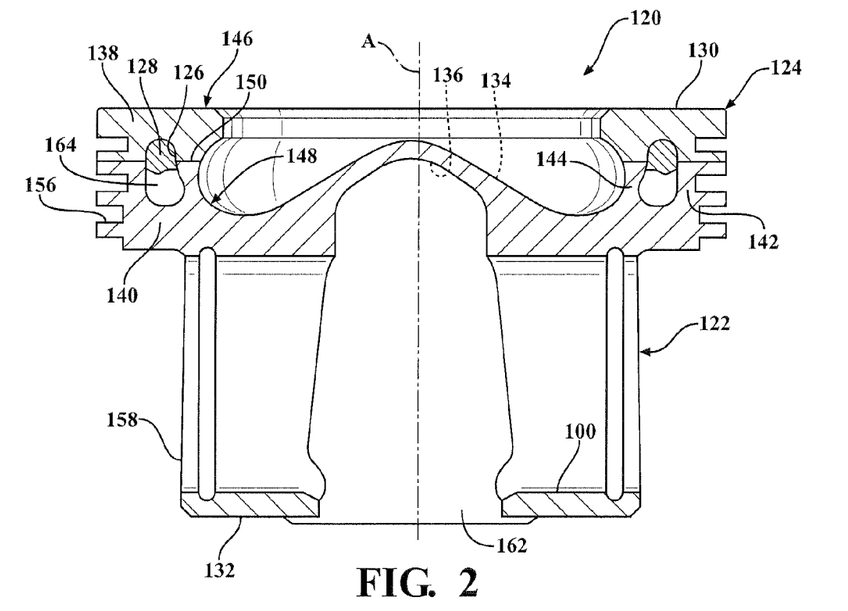
FIG. 2 is a side cross-sectional view of the piston according to a second example embodiment wherein less than 50 vol. % of the cooling gallery of the piston is filled with the solid coolant.
Figure 4:
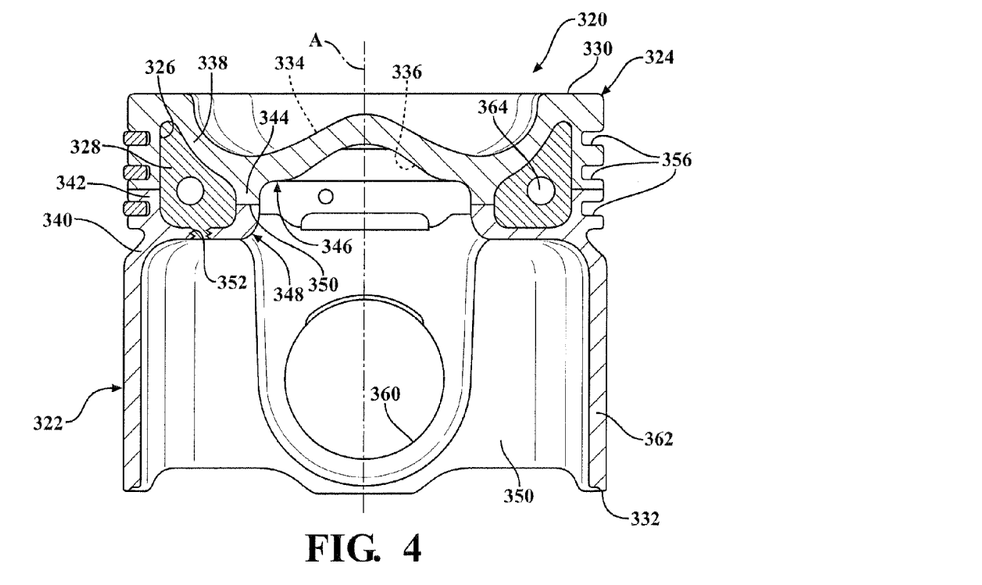
FIG. 4 is a side cross-sectional view of the piston according to a fourth example embodiment wherein greater than 50 vol. % of the cooling gallery of the piston is filled with the solid coolant.
Figure 5A:
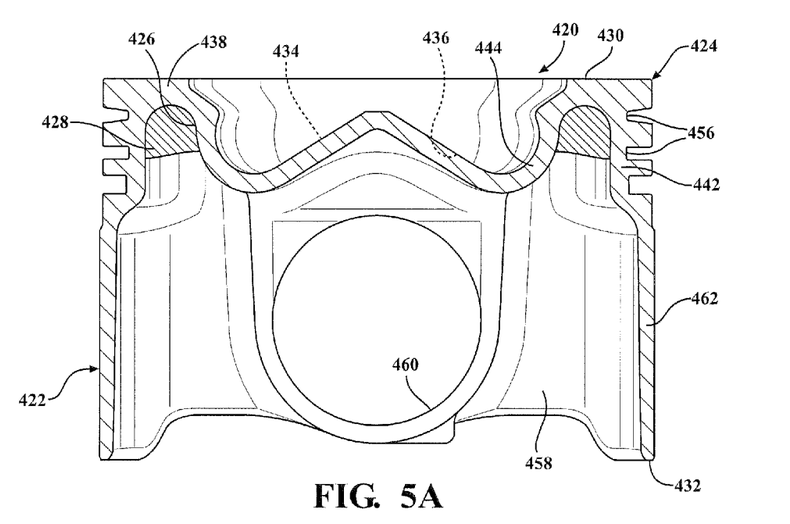
FIG. 5A is a side cross-sectional view of the piston according to a fifth example embodiment wherein about 50 vol. % of the cooling gallery of the piston is filled with the solid coolant.
Figure 5B:
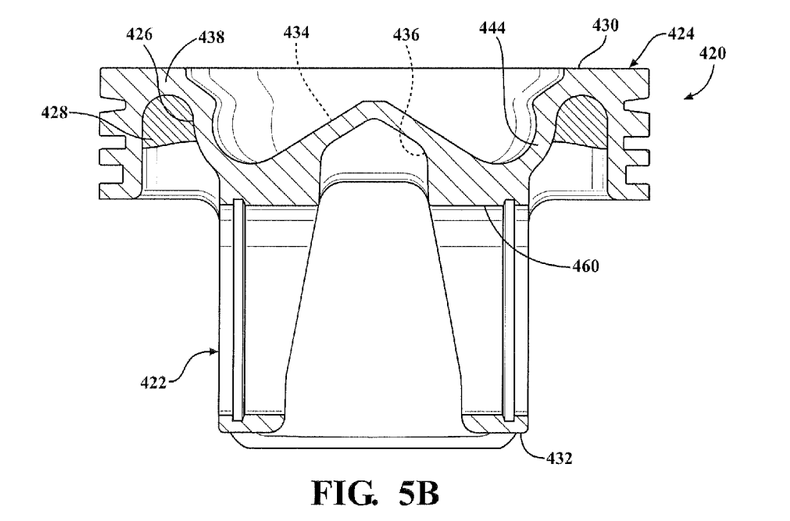
FIG. 5B is another side cross-sectional view of the piston according to the fifth example embodiment.
Figure 5C:
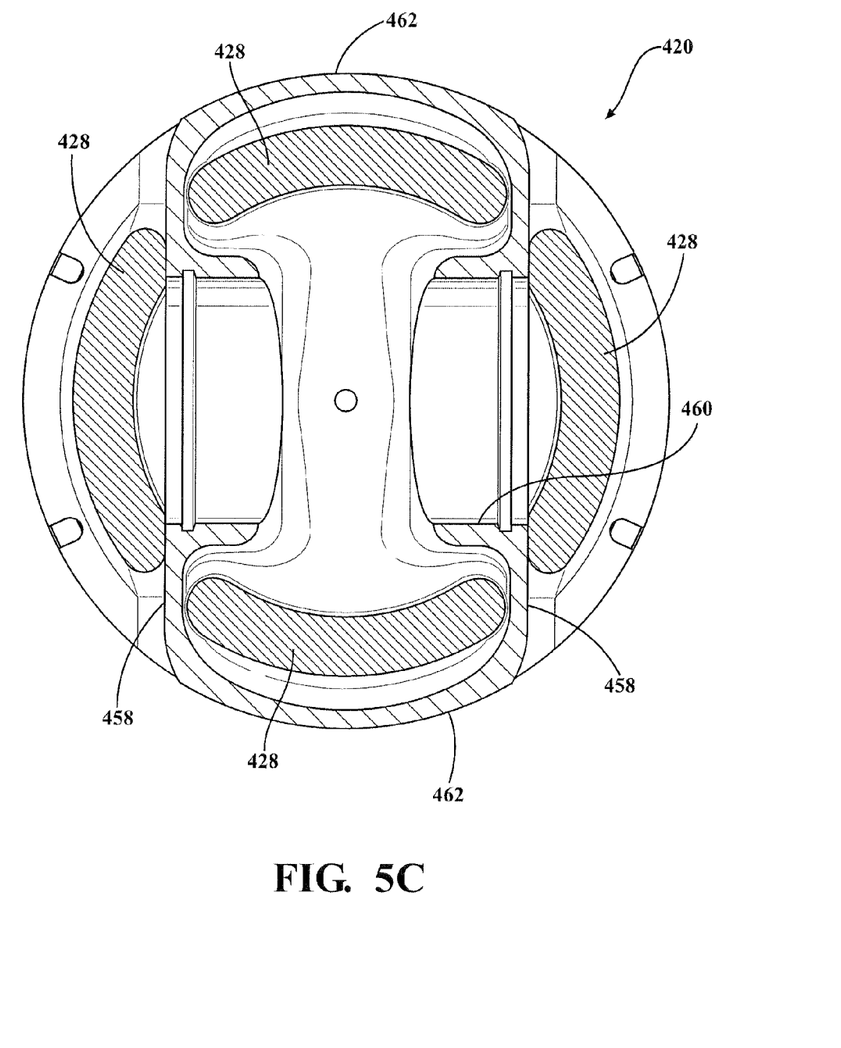
FIG. 5C is a bottom view of the piston according to the fifth example embodiment.

In the example embodiments of FIGS. 1, 2, and 4, the outer side wall 42 and inner side wall 44 of the piston 20 are formed by ribs which are joined together to define the cooling gallery 26. In these embodiments, the crown 24 includes an upper crown portion 46 and a lower crown portion 48. The upper crown portion 46 includes a first outer rib and a first inner rib, and the lower crown portion 48 includes a second outer rib and a second inner rib. In this embodiment, the first and second outer ribs are connected by welds 50 to form the outer side wall 42, and the first and second inner ribs are connected by welds 50 to form the inner side wall 44. The ribs could alternatively be attached to one another using another joining method, such as bonding or a mechanical attachment. At least one of the walls 38, 40, 42, 44, and typically the lower wall 40, includes an inlet hole 52 for allowing the coolant 28 to enter the cooling gallery 26. The inlet hole 52 to the cooling gallery 26 can be left unsealed or sealed, for example by at least one of a plug, adhesive, weld, and braze. If the solid coolant 28 fills 100% of the cooling gallery 26, as shown in FIG. 1, then the solid coolant 28 itself forms a seal along the inlet hole 52. Alternatively, the solid coolant 28 could be disposed along the upper crown portion 46 and/or the lower crown portion 48 prior to joining the crown portions 46, 48 together.

In the piston 20 of the example embodiments, the outer surface 34 of the body 22 presents an apex at the center axis A, a bowl-shaped surrounding the center axis A, and a bowl-rim surrounding the bowl-shape. The outer side wall 42 also includes a plurality of ring grooves 56 facing away from the center axis A and extending circumferentially around the center axis A. The piston 20 of the example embodiments further includes at least one pin boss 58, but typically a pair of pin bosses 58, each depending from the crown 24 and extending circumferentially about the center axis A. The at least one pin boss 58 presents a pin bore 60 extending perpendicular to the center axis A for receiving a wrist pin (not shown). The body 22 also includes at least one skirt section 62, but typically a pair of skirt sections 62, depending from the crown 24 and extending circumferentially about the center axis A. The at least one skirt section 62 is joined to the at least one pin boss 58. Typically, the skirt sections 62 are spaced from one another circumferentially about the center axis A by the pin bosses 58. The body 22 of the piston 20 could comprise various other designs other than those disclosed in FIGS. 1-5 while still including the cooling gallery 26 for containing the coolant 28.

The solid coolant 28 of the piston 20 fills at least 15 vol. % of the cooling gallery 26, but typically fills at least a majority of the volume of the cooling gallery 26. In the example embodiment of FIG. 1, the solid coolant 28 fills 100 vol. % of the cooling gallery 26. In the example embodiment of FIG. 2, the solid coolant 128 fills less than 50 vol. % of the cooling gallery 126, for example 30 to 45 vol. % of the cooling gallery 126. In the example embodiment of FIG. 3, the solid coolant 228 fills greater than 50 vol. % of the cooling gallery 226, for example 80-95 vol. %, or at least 90 vol. % of the cooling gallery 226. In the example embodiment of FIG. 4, the solid coolant 328 again fills greater than 50 vol. % of the cooling gallery 326, for example 80-95 vol. %. In the example embodiment of FIG. 5, the solid coolant 428 fills about 50 vol. % of the cooling gallery 426, for example 35-75 vol. %, or at least 40 vol. % of the cooling gallery 426. Also, in each embodiment, the coolant 28 could be disposed along only some regions of the cooling gallery 26, but not others. For example, in the embodiment of FIG. 5, the coolant 428 could be disposed adjacent the pin bosses 458 but not along the skirt sections 462.

Figure 3:
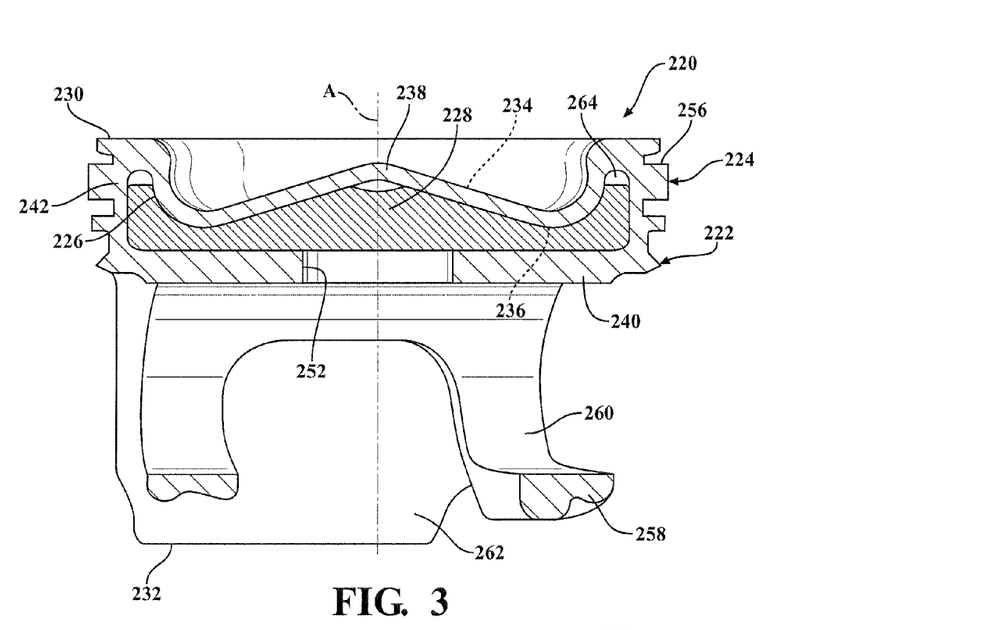
FIG. 3 is a side cross-sectional view of the piston according to a third example embodiment wherein greater than 50 vol. % of the cooling gallery of the piston is filled with the solid coolant.

In the embodiments of FIGS. 2-5, wherein the solid coolant 28 does not fill 100 vol. % of the cooling gallery 26, the remaining vol. % of the cooling gallery 26 is a pocket 64 filled with a gas, typically air. In this case, the pocket 64 can be used as a conventional oil cooling gallery by leaving the cooling gallery 26 open and unsealed so that oil can be sprayed along the solid coolant 28 and/or along the walls 38, 40, 42, 44 of the crown 24. Furthermore, if the solid coolant 28 does not fill 100 vol. % of the cooling gallery 26, then the solid coolant 28 can be disposed in various locations relative to the walls 38, 40, 42, 44 which form the cooling gallery 26. For example, in FIG. 2, the solid coolant 128 is disposed along the upper wall 138 of the piston 120 and the pocket 164 filled with air is located along the lower wall 140. This location is typically preferred for conducting heat away from the hot upper wall 138 of the crown 124, which is directly exposed to hot gases of the combustion chamber. In FIG. 3, the solid coolant 228 is disposed along the lower wall 240 of the piston 220 and the pocket 264 filled with air is located along the upper wall 38. In FIG. 4, the solid coolant 328 is disposed along each wall 338, 340, 342, 344, and the pocket 364 is spaced from the walls 338, 340, 342, 344 and located at or around the center of the cooling gallery 326. In FIG. 5, the solid coolant 428 is disposed along the upper wall 438 of the piston 420 and the pocket 464 filled with air is located along the lower end of the cooling gallery 426. In this embodiment, the cooling gallery 426 has an open bottom and exposes the solid coolant 428.

In the example embodiments shown in FIGS. 1-5, the solid coolant 28 disposed in the cooling gallery 26 remains solid even when the body 22 of the piston 20 is at a temperature of equal to or greater than 200° C., and typically equal to or greater than 350° C., for example at temperatures of the piston 20 during operation of the internal combustion engine. However, during the method of manufacturing the piston 20, the solid coolant 28 is typical heated to at least its melting temperature, and then poured or otherwise disposed in the cooling gallery 26 in liquid form. The solid coolant 28 is then allowed to solidify and remains solid throughout the life of the piston 20.

The solid coolant 28 has a thermal conductivity which is greater than the thermal conductivity of the steel material used to form the body 22 of the piston 20, and thus is able to dissipate heat away from the hot upper wall 38 of the crown 24 during operation. The solid coolant 28 can effectively cool the crown 24 while avoiding the problems associated with conventional cooling oil, such as oil coking and adherence to the surfaces 34, 36 along the cooling gallery 26. The solid coolant 28 also has decent material strength, but typically has a density less than the density of the steel material. Thus, the solid coolant 28 is able to provide additional structural support or rigidity without a significant increase in total mass of the piston 20. In addition, certain structural problems may be resolved using the solid coolant 28, which would otherwise be difficult to solve. In some cases, the solid coolant 28 could be used in place of another support structure formed of the steel material, such as a rib or wall, in which case the total mass of the piston 20 is reduced.

The solid coolant 28 typically comprises a metal material having a thermal conductivity greater than the thermal conductivity of the steel material used to form the body 22 of the piston 20. In one example embodiment, the solid coolant 28 is an aluminum-based material, for example pure aluminum or an aluminum alloy. The aluminum-based material remains solid during engine operation, even when the cooling gallery 26 reaches temperatures greater than 350° C. The aluminum-based material also has a thermal conductivity greater than the thermal conductivity of the steel material, and thus effectively dissipates heat away from the hot upper wall 38 of the crown 24. A Finite Element Analysis (FEA) was conducted on the piston 20 including the cooling gallery 26 filled with aluminum, and this FEA showed that the aluminum filled cooling gallery 26 is able to cool the upper crown 46 as effectively as standard cooling oil. The aluminum-based material also provides additional support and rigidity, but does not create a significant increase in total mass of the piston 20, due to its relatively low density compared to the steel material.

Another aspect of the invention provides a method of manufacturing the piston 20 including the solid coolant 28 in the cooling gallery 26. The method generally includes the steps of providing the body 22 formed of the steel material; and filling at least 15 volume percent (vol. %) of the cooling gallery 26 with the solid coolant 28.

When forming the example pistons 20 shown in FIGS. 1, 2, and 4, the step of providing the body 22 includes joining the upper crown portion 46 to the lower crown portion 48 to form the cooling gallery 26. This method first includes providing the upper crown portion 46 including the upper wall 38 and the pair of upper ribs depending from the upper wall 38, and providing the lower crown portion 48 including the lower wall 40 and the pair of lower ribs extending upwardly from the lower wall 40. Next, the method includes joining the upper ribs to the lower ribs to form the inner side wall 44 and the outer side wall 42 defining the cooling gallery 26 therebetween. The joining step can include welding, bonding, mechanically attaching, or using another technique to join the ribs and form the cooling gallery 26. When forming the example piston 20, 420 of FIGS. 3 and 5, the method of providing the body 222, 422 of the piston 220, 420 includes casting the steel material into the desired shape. The inlet hole 252 of FIG. 3 can be formed during or after the casting step. The step of forming the body 22 of the piston 20 could alternatively include three dimensional (3D) printing.

The step of filling the cooling gallery 26 with the solid coolant 28 typically includes forming the inlet hole 52 in one of the walls 38, 40, 42, 44 of the crown 24, typically the lower wall 40, and then pouring the solid coolant 28 through the inlet hole 52. In this embodiment, the inlet hole 52 can be formed before or after the joining step, and the step of filling the cooling gallery 26 occurs after the joining step. Typically, the step of filling the cooling gallery 26 with the solid coolant 28 includes disposing the body 22 upside down, such that the upper wall 38 is located below the lower wall 40, and pouring the solid coolant 28 in liquid form through the inlet hole 52 and into the cooling gallery 26 to make sure that the coolant 28 extends continuously along the upper wall 38. To form the piston 120 of FIG. 2, wherein the solid coolant 128 is again disposed along the upper wall 138 of the crown 124, the step of filling the cooling gallery 126 includes disposing the coolant 128 in liquid form along the upper wall 138 and/or the lower wall 140 of the crown 124 between the upper ribs and/or lower ribs before welding the upper ribs to the lower ribs, and thus the step of sealing the cooling gallery 126 is completed by the welding step. The solid coolant 128 then solidifies in the closed cooling gallery 126. Alternatively, the step of filling the cooling gallery 226 of FIG. 3 with the solid coolant 228 can include pouring the coolant 228 into the cooling gallery 226 in liquid form, and allowing the coolant 228 to solidify along the lower wall 240 of the crown 224. To form the piston 320 of FIG. 4, wherein the coolant 328 extends along each of the walls 338, 340, 342, 344 and the pocket 364 of air is located in the center of the cooling gallery 326, the step of filling the cooling gallery 326 includes disposing a salt core into the cooling gallery 326 before the welding step, and then pouring the coolant 328 in liquid form around the salt core after the welding step. The coolant 328 is allowed to solidify prior to use in the internal combustion engine, and remains solid throughout the life of the piston 320. For the piston of FIG. 5, the step of filling the cooling gallery 426 includes pouring the coolant 428 in liquid into the cooling gallery 426 after casting the body 422 of the piston 420, while the piston 420 is upside down, and allowing the coolant 428 to solidify.

When forming the piston 20 of FIGS. 1, 3, and 4, the method includes sealing the inlet hole 52 to the cooling gallery 26 with the solid coolant 28. Alternatively a plug, adhesive, weld, and/or braze can be used to seal the inlet hole 52 to the cooling gallery 26. The step of joining the upper crown portion 46 to the lower crown portion 48 to form the cooling gallery 26 also seals the cooling gallery 26. If the solid coolant 28 fills less than 100 vol. % of the cooling gallery 26, then the cooling gallery 26 can be left open, unsealed, and used as a conventional oil gallery. As shown in FIG. 5, the method can alternatively include leaving the bottom of the cooling gallery 426 completely open for exposure to the oil spray.

Obviously, many modifications and variations of the present invention are possible in light of the above teachings and may be practiced otherwise than as specifically described while within the scope of the appended claims.

What is claimed is:

1. A piston for an internal combustion engine, comprising:
a body formed of a steel material having a thermal conductivity and extending circumferentially about a center axis;
said body including a crown and a cooling gallery extending along at least a portion of said crown and circumferentially about said center axis;
a coolant filling at least 15 volume percent (vol. %) of said cooling gallery;
said coolant having a thermal conductivity greater than said thermal conductivity of said steel material of said body;
said coolant being a monolithic solid aluminum-based material extending circumferentially continuously about said center axis along said portion of said crown and remaining solid at a temperature of at least 200° C. such that said coolant provides solid structural support to said crown at piston operating temperature of at least 200° C.; and
all surfaces of said coolant being exposed to gas or engaging said steel material of said body.

2. The piston of claim 1, wherein said crown includes an upper wall, a lower wall, and at least one side wall defining said cooling gallery, said coolant extends continuously along said upper wall, said coolant fills less than 100 vol. % of said cooling gallery and defines a pocket filled with said gas, said gas is air, and said pocket is spaced from said upper wall by said coolant.

3. The piston of claim 1, wherein said crown includes an upper crown portion and a lower crown portion, said upper crown portion includes a first outer rib and a first inner rib, said lower crown portion includes a second outer rib and a second inner rib, said outer ribs are joined to form an outer side wall, said inner ribs are joined to form an inner side wall, and said side walls define said cooling gallery.

4. The piston of claim 1, wherein said crown includes a plurality of walls defining said cooling gallery, at least one of said walls includes an inlet hole to said cooling gallery.

5. The piston of claim 4, wherein said inlet hole is sealed by at least one of said solid coolant, a plug, adhesive, weld, and braze.

6. The piston of claim 1, wherein said crown includes an upper wall and an inner side wall and an outer side wall together defining said cooling gallery, and said cooling gallery is open.

7. The piston of claim 1, wherein said body extends circumferentially around a center axis and longitudinally along said center axis from an upper end to a lower end;
said body includes an outer surface and an inner surface;
said crown includes an upper wall and a lower wall and at least one side wall;
said inner surfaces of said upper wall and said lower wall and said at least one side wall of said crown define said cooling gallery;
said outer surface of said crown presents an apex at said center axis, a bowl-shape surrounding said center axis, and a bowl-rim surrounding said bowl-shape;
said at least one side wall includes an outer side wall;
said outer surface of said outer side wall presents a plurality of ring grooves facing away from said center axis and extending circumferentially around said center axis;
said cooling gallery extends circumferentially around said center axis;
said coolant fills at least 50 vol. % of said cooling gallery;
said body includes at least one pin boss depending from said crown and extending circumferentially about said center axis;
said at least one pin boss presents a pin bore extending perpendicular to said center axis;
said body includes at least one skirt section depending from said crown and extending circumferentially about said center axis, and said at least one skirt section is joined to said at least one pin boss.

8. A piston for an internal combustion engine, comprising:
a body formed of a steel material having a thermal conductivity and extending circumferentially about a center axis;
said body including a crown and a cooling gallery extending along at least a portion of said crown and circumferentially about said center axis;
a coolant filling a volume percent (vol. %) of said cooling gallery;
said coolant having a thermal conductivity greater than said thermal conductivity of said steel material of said body;
said coolant being a monolithic aluminum-based material extending circumferentially continuously about said center axis along said portion of said crown such that said coolant provides solid structural support to said crown at piston operating temperature of at least 200° C.; and
wherein said coolant fills at least 90 vol. % of said cooling gallery.

9. The piston of claim 8, wherein said coolant fills 100 vol. % of said cooling gallery.

10. A piston for an internal combustion engine, comprising:

a body formed of a steel material having a thermal conductivity and extending circumferentially about a center axis;
said body including a crown and a cooling gallery extending along at least a portion of said crown and extending circumferentially about said center axis, said cooling gallery being sealed;
a coolant filling at least 15 volume percent (vol. %) of said sealed cooling gallery;
said coolant having a thermal conductivity greater than said thermal conductivity of said steel material of said body;
said coolant being a monolithic aluminum-based material extending circumferentially continuously about said center axis along said portion of said crown such that said coolant provides solid structural support to said crown at piston operating temperature of at least 200° C.; and
wherein said crown includes a plurality of walls defining said sealed cooling gallery, said coolant extends continuously along each of said walls and completely around said sealed cooling gallery, said coolant fills less than 100 vol. % of said sealed cooling gallery and defines a pocket filled with air, and said pocket is spaced from each of said walls by said coolant.

11. A piston for an internal combustion engine, comprising:
a body formed of a steel material having a thermal conductivity and extending circumferentially about a center axis;
said body including a crown and a cooling gallery extending along at least a portion of said crown and extending circumferentially about said center axis;
a coolant filling at least 15 volume percent (vol. %) of said cooling gallery;
said coolant having a thermal conductivity greater than said thermal conductivity of said steel material of said body;
said coolant being a monolithic aluminum-based material extending circumferentially continuously about said center axis along said portion of said crown such that said coolant provides solid structural support to said crown at piston operating temperature of at least 200° C.; and wherein said crown includes an upper wall and a lower wall and an outer side wall together defining said cooling gallery, and said cooling gallery extends continuously along said upper wall of said crown and through a center axis of said piston.

12. A method of manufacturing a piston for an internal combustion engine, comprising the steps of:
providing a body formed of a steel material having a thermal conductivity and extending circumferentially about a center axis, the body including a crown with a cooling gallery extending along at least a portion of the crown and extending circumferentially about the center axis; and
filling at least 15 volume percent (vol. %) of the cooling gallery with a coolant, the coolant having a thermal conductivity greater than the thermal conductivity of the steel material of the body, the coolant being a monolithic aluminum-based material extending circumferentially continuously about the center axis along the portion of the crown and remaining a solid at a temperature of at least 200° C. such that the coolant provides solid structural support to the crown at piston operating temperature of at least 200° C., and all surfaces of the coolant being exposed to gas or engaging the steel material of the body.

13. The method of claim 12, wherein the step of providing the body includes providing an upper crown portion including an upper wall and a pair of upper ribs depending from the upper wall, providing a lower crown portion including a lower wall and a pair of lower ribs extending upwardly from the lower wall, and joining the upper ribs to the lower ribs to form an inner wall and an outer wall defining the cooling gallery therebetween.

14. The method of claim 13, wherein the step of filing the cooling gallery with the coolant includes disposing the coolant along at least one of the upper wall and the lower wall between the ribs before joining the upper ribs to the lower ribs.

15. The method of claim 13, wherein the step of providing the body includes forming an inlet hole in one of the walls before filling the cooling gallery with the coolant; and the step of filling the cooling gallery with the coolant includes pouring the coolant in liquid form through the inlet hole and into the cooling gallery after joining the upper ribs to the lower ribs.

16. The method of claim 15 including the step of sealing the inlet hole to the cooling gallery with at least one of the solid coolant, a plug, adhesive, weld, and braze.

17. The method of claim 12, wherein the step of providing the body includes casting the steel material to form the crown with a plurality of walls defining a cooling gallery, and forming an inlet hole in one of the walls to the cooling gallery before filling the cooling gallery with the coolant; and
the step of filling the cooling gallery with the coolant includes pouring the coolant in liquid form through the inlet hole and into the coolant gallery.

18. The method of claim 12, wherein the step of providing the body includes providing the crown with an upper wall, a lower wall, and at least one side wall defining the cooling gallery;
the step of providing the body further includes forming an inlet hole in one of the walls to the cooling gallery and providing at least one pin boss and/or skirt section depending from the lower wall; and
the step of filling the cooling gallery includes disposing the upper wall below the lower wall and pouring the coolant in liquid form through the inlet hole and into the cooling gallery so that the coolant extends continuously along the upper wall.

19. The method of claim 12, wherein the step of providing the body includes providing the crown with an upper wall and an inner side wall and an outer side wall together defining the cooling gallery such that the cooling gallery is open;
the step of providing the body includes providing at least one pin boss and/or skirt section depending from the crown; and the step of filling the open cooling gallery includes disposing the upper wall below the at least one pin boss and/or skirt section and pouring the coolant in liquid form into the cooling gallery.

20. The method of claim 12, wherein the step of providing the body includes three dimensional printing the steel material.

21. A method of manufacturing a piston for an internal combustion engine, comprising the steps of:

providing a body formed of a steel material having a thermal conductivity and extending circumferentially about a center axis, the body including a crown with a cooling gallery extending along at least a portion of the crown and extending circumferentially about the center axis; and
filling a volume percent (vol. %) of the cooling gallery with a coolant, the coolant having a thermal conductivity greater than the thermal conductivity of the steel material of the body, the coolant being a monolithic aluminum-based material extending circumferentially continuously about the center axis along the portion of the crown such that the coolant provides solid structural support to the crown at piston operating temperature of at least 200° C., and wherein the step of filling the cooling gallery includes filling at least 90 vol. % of the cooling gallery with the coolant.

22. The method of claim 21, wherein the step of filling the cooling gallery includes filling 100 vol. % of the cooling gallery with the coolant.

23. A method of manufacturing a piston for an internal combustion engine, comprising the steps of:
providing a body formed of a steel material having a thermal conductivity and extending circumferentially about a center axis, the body including a crown with a plurality of walls defining a cooling gallery, the cooling gallery being sealed and extending circumferentially about the center axis; and
filling at least 15 volume percent (vol. %) of the sealed cooling gallery with a coolant such that the coolant extends continuously along each of the walls and completely around the sealed cooling gallery, the coolant filling less than 100 vol. % of the sealed cooling gallery and defining a pocket filled with air, the pocket being spaced from each of the walls by the coolant, the coolant having a thermal conductivity greater than the thermal conductivity of the steel material of the body, and the coolant being a monolithic aluminum-based material extending circumferentially continuously about the center axis such that the coolant provides solid structural support to the crown at piston operating temperature of at least 200° C.

24. A method of manufacturing a piston for an internal combustion engine, comprising the steps of:
providing a body formed of a steel material having a thermal conductivity and extending circumferentially about a center axis, the body including a crown with an upper wall and a lower wall and an outer side wall together defining a cooling gallery, the cooling gallery extending continuously along the upper wall of the crown and through the center axis of the piston; and
filling at least 15 volume percent (vol. %) of the cooling gallery with a coolant, the coolant having a thermal conductivity greater than the thermal conductivity of the steel material of the body, and the coolant being a monolithic aluminum-based material extending continuously along the upper wall of the crown and through the center axis of the piston such that the coolant provides solid structural support to the crown at piston operating temperature of at least 200° C.

* * * * *